US009497272B1

(12) United States Patent
Winters et al.

(10) Patent No.: US 9,497,272 B1
(45) Date of Patent: *Nov. 15, 2016

(54) MODULE-BASED DEVICE INTERACTION SYSTEM

(71) Applicant: ioBridge, Inc., Marlborough, MA (US)

(72) Inventors: Jason Thomas Winters, Winston-Salem, NC (US); Il Park, Austin, TX (US); Peter Hans Scharler, Uniontown, PA (US)

(73) Assignee: ioBridge, Inc., Marlborough, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/144,074

(22) Filed: Dec. 30, 2013

Related U.S. Application Data

(63) Continuation of application No. 13/585,362, filed on Aug. 14, 2012, now Pat. No. 8,667,102, which is a continuation of application No. 12/629,455, filed on Dec. 2, 2009, now Pat. No. 8,271,629.

(60) Provisional application No. 61/200,692, filed on Dec. 2, 2008.

(51) Int. Cl.
*G06F 15/16* (2006.01)
*H04L 29/08* (2006.01)

(52) U.S. Cl.
CPC .................. *H04L 67/141* (2013.01)

(58) Field of Classification Search
CPC ............. H04L 12/1813; H04L 51/046; H04L 65/403; G06F 15/16; G06Q 50/01; G06Q 20/401
USPC ....................... 709/217, 222, 224; 705/40, 75
See application file for complete search history.

(56) References Cited

U.S. PATENT DOCUMENTS

| 5,822,398 A | * | 10/1998 | Hall | H04J 3/14 370/514 |
| 5,915,119 A | | 6/1999 | Cone | |
| 6,332,202 B1 | | 12/2001 | Sheikh et al. | |
| 6,421,782 B1 | | 7/2002 | Yanagisawa et al. | |
| 6,526,507 B1 | | 2/2003 | Cromer et al. | |

(Continued)

FOREIGN PATENT DOCUMENTS

| ES | 2315049 A1 | 3/2009 |
| JP | 2005109763 | 4/2005 |

OTHER PUBLICATIONS

Yehuda Katz. wake_on_lan.widget.php. 78 lines on 3 pages. Posted Dec. 15, 2010. Available online: https://github.com/pfsense/pfsense/commit/254ac496401b2259a17dc2deee1fa19f963d89c6.

(Continued)

*Primary Examiner* — Tesfay Yohannes
(74) *Attorney, Agent, or Firm* — Cesari & McKenna, LLP; Omar M. Wadhwa

(57) ABSTRACT

A system that enables a person to monitor and/or control a device via a network, such as the Internet, via an interactive hardware module that interfaces with the device and communicates with a module server located locally or remotely from the placement of the module. The hardware module allows for the transmission and receipt of data between the device interfaced to the hardware module and the module server, thereby enabling the user manually or automatically to control or monitor the device via an access medium, such as an API.

26 Claims, 5 Drawing Sheets

(56) References Cited

U.S. PATENT DOCUMENTS

| | | |
|---|---|---|
| 6,591,368 B1 | 7/2003 | Ryu |
| 6,628,663 B1 | 9/2003 | Cromer et al. |
| 6,785,805 B1 | 8/2004 | House |
| 6,826,689 B1* | 11/2004 | Hou .......................... H04L 9/08 380/260 |
| 6,996,773 B2 | 2/2006 | Friedman et al. |
| 7,170,391 B2* | 1/2007 | Lane et al. ................... 340/5.82 |
| 7,298,259 B2 | 11/2007 | Moriwaki |
| 7,334,051 B2 | 2/2008 | Koyata et al. |
| 7,350,238 B2 | 3/2008 | Abe et al. |
| 7,379,474 B1 | 5/2008 | Wong |
| 7,450,638 B2 | 11/2008 | Iwamura |
| 7,600,064 B2 | 10/2009 | Knowles et al. |
| 7,643,487 B2 | 1/2010 | Sethuram et al. |
| 7,725,944 B2* | 5/2010 | Spalink et al. ................ 726/26 |
| 7,780,514 B2 | 8/2010 | Walker et al. |
| 7,861,006 B2* | 12/2010 | McNulty ....................... 709/250 |
| 7,908,666 B2 | 3/2011 | Chida et al. |
| 2002/0038371 A1* | 3/2002 | Spacey ............... H04L 63/0272 709/227 |
| 2003/0215114 A1* | 11/2003 | Kyle ....................... G06F 21/32 382/115 |
| 2005/0005026 A1 | 1/2005 | Brown et al. |
| 2005/0021711 A1 | 1/2005 | Stieger et al. |
| 2005/0055725 A1* | 3/2005 | Stewart .............. H04N 7/17336 725/92 |
| 2005/0177507 A1* | 8/2005 | Bandych et al. ............... 705/40 |
| 2005/0180326 A1 | 8/2005 | Goldflam et al. |
| 2005/0208825 A1 | 9/2005 | Chan |
| 2006/0067357 A1 | 3/2006 | Rader |
| 2006/0077423 A1 | 4/2006 | Mathieson et al. |
| 2006/0181846 A1* | 8/2006 | Farnsworth ............... G06F 1/20 361/695 |
| 2007/0067445 A1 | 3/2007 | Vugenfirer et al. |
| 2007/0070998 A1 | 3/2007 | Sethuram et al. |
| 2007/0162417 A1 | 7/2007 | Cozianu et al. |
| 2007/0192579 A1 | 8/2007 | Lee et al. |
| 2007/0245086 A1* | 10/2007 | Odom .................... G01D 9/005 711/115 |
| 2007/0250597 A1 | 10/2007 | Resner et al. |
| 2008/0076528 A1* | 3/2008 | Nguyen et al. ................. 463/25 |
| 2008/0080500 A1 | 4/2008 | Shimura et al. |
| 2008/0229091 A1 | 9/2008 | Abu-Akel |
| 2008/0319914 A1* | 12/2008 | Carrott .......................... 705/75 |
| 2009/0067441 A1 | 3/2009 | Ansari |
| 2009/0210519 A1 | 8/2009 | Zill et al. |
| 2009/0216827 A1 | 8/2009 | Hirase et al. |
| 2009/0285545 A1* | 11/2009 | Bon ....................... H04N 7/163 386/239 |
| 2010/0057943 A1 | 3/2010 | Petricoin, Jr. |
| 2010/0076662 A1* | 3/2010 | Sheidler ............... A01D 41/127 701/102 |
| 2010/0174660 A1* | 7/2010 | Clark ................... G06Q 20/403 705/318 |
| 2010/0191795 A1 | 7/2010 | Hering |
| 2010/0235279 A1* | 9/2010 | Bouchard .............. G06Q 20/02 705/44 |
| 2010/0260037 A1 | 10/2010 | Wu et al. |
| 2011/0131292 A1* | 6/2011 | McNulty ............. H04L 63/0272 709/217 |
| 2011/0225293 A1* | 9/2011 | Rathod ......................... 709/224 |
| 2012/0131158 A1* | 5/2012 | Winters et al. .............. 709/222 |
| 2012/0278636 A1 | 11/2012 | Lin et al. |

OTHER PUBLICATIONS

Yehuda Katz et al. "Feature #1103: Wake-on-Lan Widget for Dashboard (with code)". Dec. 14, 2010. 2 pages. Available online: https://redmine.pfsense.org/issues/1103.

Pan-Lung Tsai, Chin-Laung Lei, Wen-Yang Wang. "A Remote Control Scheme for Ubiquitous Computing." In "Proceedings of the 2004 IEEE International Conference on Networking, Sensing, and Control". Taipei, Taiwan: Mar. 21-23, 2004. pp. 1020-1025.

"Wake up on LAN". Author unknown. Post dated Sep. 10, 2004. 2 pages. Available online: http://www.nbtnet.newboundary.com/forum/Topic687-20-1.aspx.

"Wake up on LAN problems". Author unknown. Post dated May 15, 2007. 2 pages. Available online: http://www.nbtnet.newboundary.com/forum/Topic1485-5-1.aspx.

"Troubleshooting tips for Wake on LAN (WOL)". Author unknown. Dated Oct. 4, 2005. Archived Jan. 2, 2007. 3 pages. Available online: https://web.archive.org/web/20070102040558/http://www.nbtnetnewboundary.com/supporlkb/Arlicle.aspx?i d=10264.

"Prism Deploy Guide." Author unknown. Published Dec. 2010 by New Boundary Technologies, Inc. 92 pages.

Gil-Martinez-Abarca, J.A, Marcos-Jorquera, D., Gilart-Iglesias, V. "Wake on LAN over Internet as Web Service." Published in: IEEE Conference on Emerging Technologies and Factory Automation, 2006. Sep. 20-22, 2006. pp. 1261-1268.

Macia-Perez et al. Machine translations of description and claims for Spanish patent application #200501234, filed May 20, 2005 and published in Spanish on Mar. 16, 2009 as publication No. ES2315049A1.

Author Unknown, BigFix Power Management: Users Guide.: Published by BIgFix, Inc. Apr. 2009, 26 pages.

Tscot9l et al. "WOL Question—Different Subnets in Same Building." Aug. 25-Sep. 9, 2010, 4 pages. Available online: https://www.ibm.com/developerworks/community/forums/html/topic?id=77777777-0000-0000-0000-000014739143.

Guido Socher. "Using the tuxgraphics embedded web server for Wake on Lan (WOL)." 5 pages. Dated Apr. 14, 2009. Archived Apr. 25, 2009. Available online: https://web.archive.org/web/20090425154159/http://tuxgraphics.org/electronics/200904/wol.shtml.

Machine translation of JP 2005109763 A.

IoBridge, "X10 Home Automation: Control your X1- modules online via your secure dashboard or website" Archived Aug. 6, 2010, 2 pages, Available Online: https://www.archive.org/web/20100806181211/http://iobridge/com/technology/x10-home-automation.html.

cygnet853, "x10 control with iobridge" youtube video uploaded Dec. 7, 2008, one minute, 23 secs., available online: https://www.youtube.com/watch?v=Pr-DkaWkK0o.

IoBridge. "IO-204 Monitor & Control Module" Updated Dec. 30, 2008. Archived Jan. 26, 2009. 10 Pages. Available Online: https://web.archive/org/web/20090126231854/http://iobridge.com/technology/IO-2-4_manual.pdf.

IoBridge. "Technology: Here is how are [sic] system works" Archived Dec. 10, 2008, 2 pages. available online: https://web/archive.org/web/20081210154400/http://www.iobridge.com/technology/.

IoBridge. "Data Feed API" updated Dec. 25, 2008, Archived Jan. 26, 2009. 9 pages. Available online: https://web.archive.org/web/20090126205433/http://iobridge.com/technology/Data_Feed_API.pdf.

C. Morris (ed.) "Module" In Academic press Dictionary of science and technology. Oxford, United Kingdom: Elsevier Science & Technology, 1992. 2 pages. Available from http://search.credoreference.com/content/entry/apdst/module/0.

wolfgang, "ioBridge Connect. Forums . General . Feature Requests . WOL, Wake on Lan", Originally dated Apr. 12, 2009. 2 printed pages. Available online: https://web.archive.org/web/20160509172136/https://connect. iobridge.com/forum/wol-wake-on-lan/.

C Morris (ed.) "Module". in Academic press Dictionary of science and technology. Oxford, United Kingdom: Elsevier Science & Technology, 1992. 2 pages. Available from: http://search.credoreference.com/content/entry/apdst/module/0.

* cited by examiner

MODULE-BASED DEVICE INTERACTION SYSTEM

CROSS-REFERENCE

This application is a continuation of U.S. patent application Ser. No. 13/585,362, filed Aug. 14, 2012, which is a continuation of U.S. patent application Ser. No. 12/629,455, filed Dec. 2, 2009, now issued U.S. Pat. No. 8,271,629, which claims the benefit of U.S. provisional application No. 61/200,692, filed Dec. 2, 2008. Each of these applications is incorporated by reference herein, in their entireties, for all purposes.

TECHNICAL FIELD

This application relates generally to the control of remote mechanisms via a network. More particularly, the present invention relates to a system and method for a Web-based medium for controlling or monitoring devices using a wireless or wired network and/or Internet connections.

BACKGROUND

Controlling devices over the Internet requires considerable knowledge across several fields. For example, to manipulate a device via the Internet, such as via an interactive Web site, a person may need to understand Web site design, networking, server management, communication protocols, multiple programming languages, embedded systems, and mechatronics. As such, the vast majority of people do not possess the necessary skills to configure a system allowing for the control a device via the World Wide Web.

In addition to the knowledge required, the hardware requirements of such an undertaking are prohibitive small entities, such as individuals or small organizations. Current Web-based device monitoring and control interface systems are meant for industrial applications. The expense and power requirements of industrial equipment are too great to make this a realistic solution. In addition, the equipment is rather large, consuming large cabinets and racks impractical for home or small business use. This solution may also require familiarity with the equipment's programming interface and custom cabling and hardware.

Other current solutions for Web-based device control require a person to establish a server which accepts requests from the Internet. These servers are typically embedded Web servers that host their own Web pages for device interaction. The Internet connections employed by small entities are typically based on dynamic internet protocol (IP) address assignment. Hosting a server on a dynamic IP address is problematic because the IP address may change, causing a disruption in the server's connection to the Internet and preventing a remote user from contacting the server. Additionally, hosting a server requires the user to configure the local network. An average person may have difficulty with the intricacies of remapping router ports and other such matters. Furthermore, some individuals may not have access to their Internet connection networking equipment, such as people living in apartment complexes or dormitories. Internet Service Providers (ISPs) may cause additional problems for server-based architectures. Many ISPs frown upon users hosting servers and may block ports used for this.

Both the aforementioned industrial and server solutions lack convenient mechanisms for Web site and Web service integration. Considerable knowledge of Hypertext Markup Language (HTML), JavaScript, and Application Programming Interfaces (APIs) is required to place any controls on a Web site or to establish access via a Web service (such as a social network), web application, desktop program, mobile application, or the like. As a result, such a solution requires customized Web site integration which, again, is beyond the skills of the average user.

What is needed is a convenient system and method that enables an average person to configure an architecture to control or monitor a device via a Web-based medium.

SUMMARY

The present invention addresses the aforementioned needs by providing a system that enables a person to monitor and/or control a device via a network, such as the Internet, via an interactive hardware module that interfaces with the device and communicates with a module server located locally or remotely from the placement of the module. The hardware module allows for the transmission and receipt of data between the device interfaced to the hardware module and the module server, thereby enabling the user manually or automatically to control or monitor the device via an access medium, such as an API.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof that are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person with ordinary skill in the relevant art will recognize that other components and configurations may be used without parting from the spirit and scope of the invention.

Figure 1:
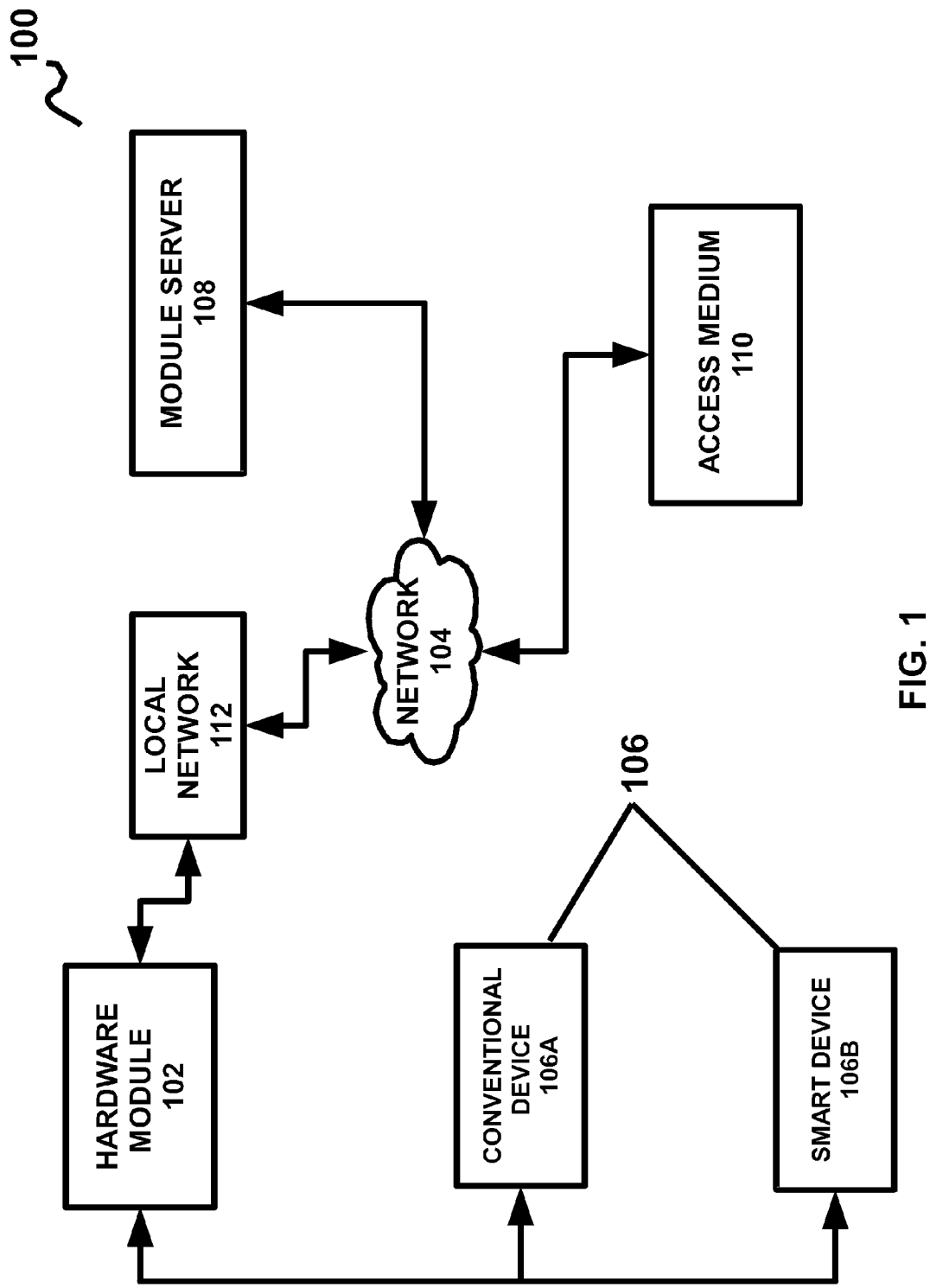
FIG. 1 illustrates a general architecture overview of an embodiment of a module-based device interaction system.

FIG. 1 illustrates a general architecture overview of an embodiment of a module-based device interaction system (MBDIS) [100]. Although only a single instance of each component is depicted, this is for illustrative purposes only and is not to be construed as limiting. The components of the MBDIS [100] can interact with one another via a network [104], which may be any applicable electronic and/or wireless network. The network [104] can be a wide-area network (WAN), such as the Internet or a mobile network. The MBDIS [100] can include a hardware module [102] configured to be an input/output (I/O) mechanism and enabled to allow for connections to one or more devices [106]. The hardware module [102] can be connected via the network [104] to a module server [108], thereby serving as a link between the device [106] and the module server [108]. The hardware module [102] can connect to the network [104] via a local network [112], such as a local area network (LAN) or wireless local area network (WLAN).

The module server [108] can receive data messages sent by the hardware module [102], such as those relayed from an interfaced device [106]. The module server [108] can relay such communication to an access medium [110] and/or another hardware module [102] connected to the network [104]. The module server [108] can interface with an access medium [110] to transmit communications to or from the hardware module [102] and to configure the hardware module [102].

An access medium [110] can be a mechanism by which a user can control or monitor a device [106]. For example, an access medium [110] can enable a user to operate a device [106], monitor the status of a device [106], receive and/or review data generated by a device [106], or the like. In one embodiment, an access medium [110] can be accessible by various agents, such as a personal computer, a mobile device, or the like. For example, an access medium [110] can be a Web service, such as, for example, a streaming server, a push-driven server, an email server, a social network, a database, an event notification service, a scripting server, a Web page, or the like. Additionally, an access medium [110] can comprise an API, such as a Web widget or gadget, another convenient programming interface, or the like. Alternatively, an access medium [110] can be a Web interface, such as a dynamic scripting, a Flash interface, or the like.

Data transmitted between one or more of the device [106], the hardware module [102], the module server [108], and the access medium [110] can be encrypted, such as via a compressible encryption technique encapsulated and translated over common internetworking protocols and networking technologies.

Hardware Module

The hardware module [102] can act as a client to the module server [108]. This configuration enables the MBDIS [100] to overcome problems inherent in hosting a server. A dynamic IP address is no longer problematic. The hardware module [102] can initiate the connection to the module server [108] and, as such, there is no need to keep track of the user's IP address. Additionally, an ISP does not block outbound traffic from a user's location (as opposed to in-bound traffic, as would be the case if the user employed a local server), as this would be the equivalent to preventing the user from accessing the Internet entirely. Furthermore, as the hardware module [102] itself establishes the connection as a client to the module server [108], there is no need for any network configuration on the part of the user. All traffic generated by the use of the hardware module [102] is viewed as normal traffic by the network [104]. This enables the hardware module [102] to work through firewalls and proxy servers.

The design of the hardware module [102] can vary per implementation. In one example, the hardware module [102] may be constructed of a two-sided, 0.060 inch-thick printed circuit board (PCB). A top and bottom plate of 0.125 inch clear acrylic, fixed in place by spacers and screws, may provide a simple, exterior structure for the hardware module [102]. A label on the top surface of the hardware module [102] may indicate the model number, serial number, connection assignments, media access control (MAC) address, and I/O channel pin out, and the like. In totality, the hardware module [102] may be 3.8 inches×2.5 inches×1.24 and weighs approximately 90 grams. In other scenarios, the hardware module [102] may be smaller or larger and may be constructed of different materials.

Figure 2:
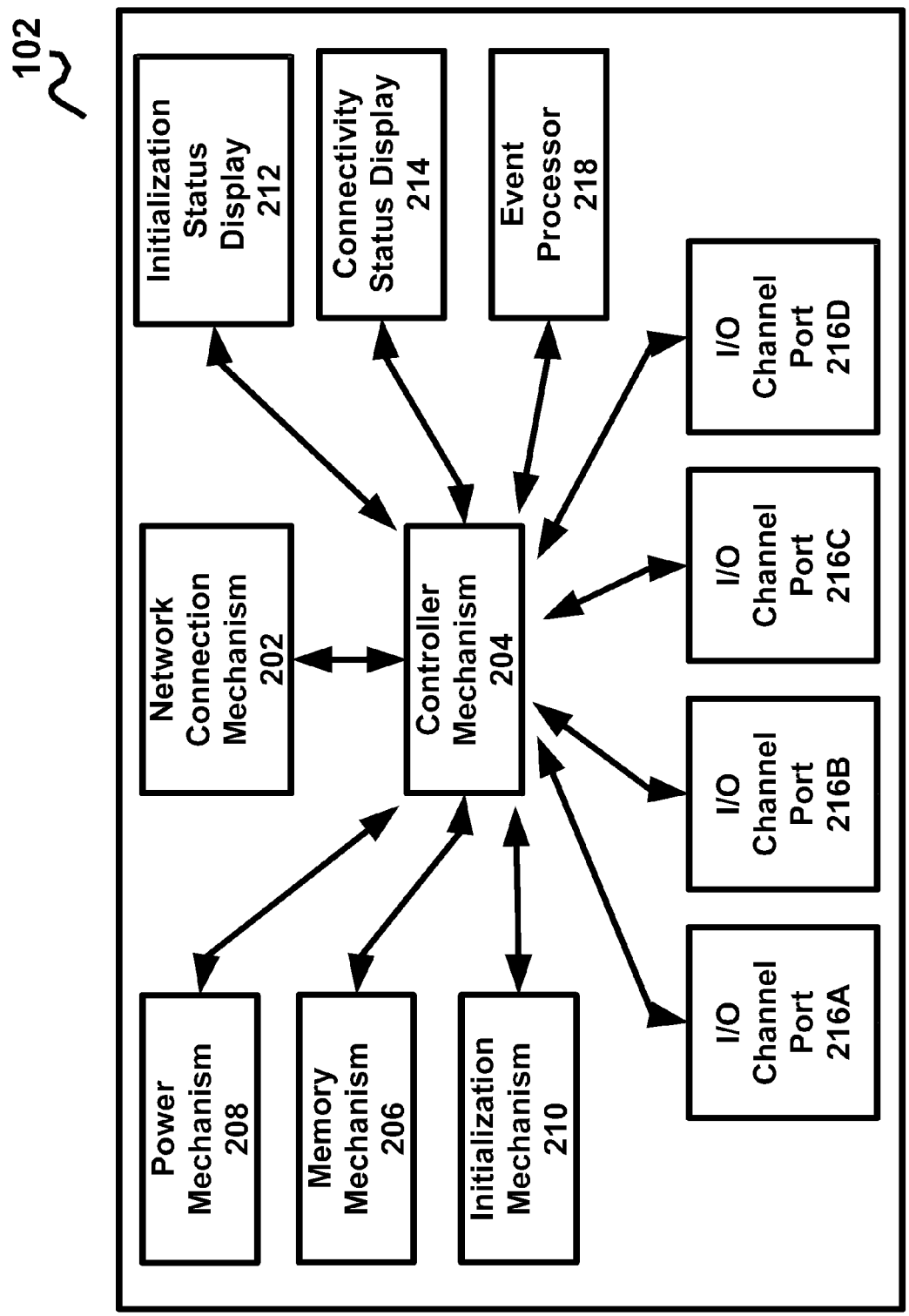
FIG. 2 illustrates an example of an embodiment of a hardware module enabled for Web-based device control or monitoring.
Figure 3:
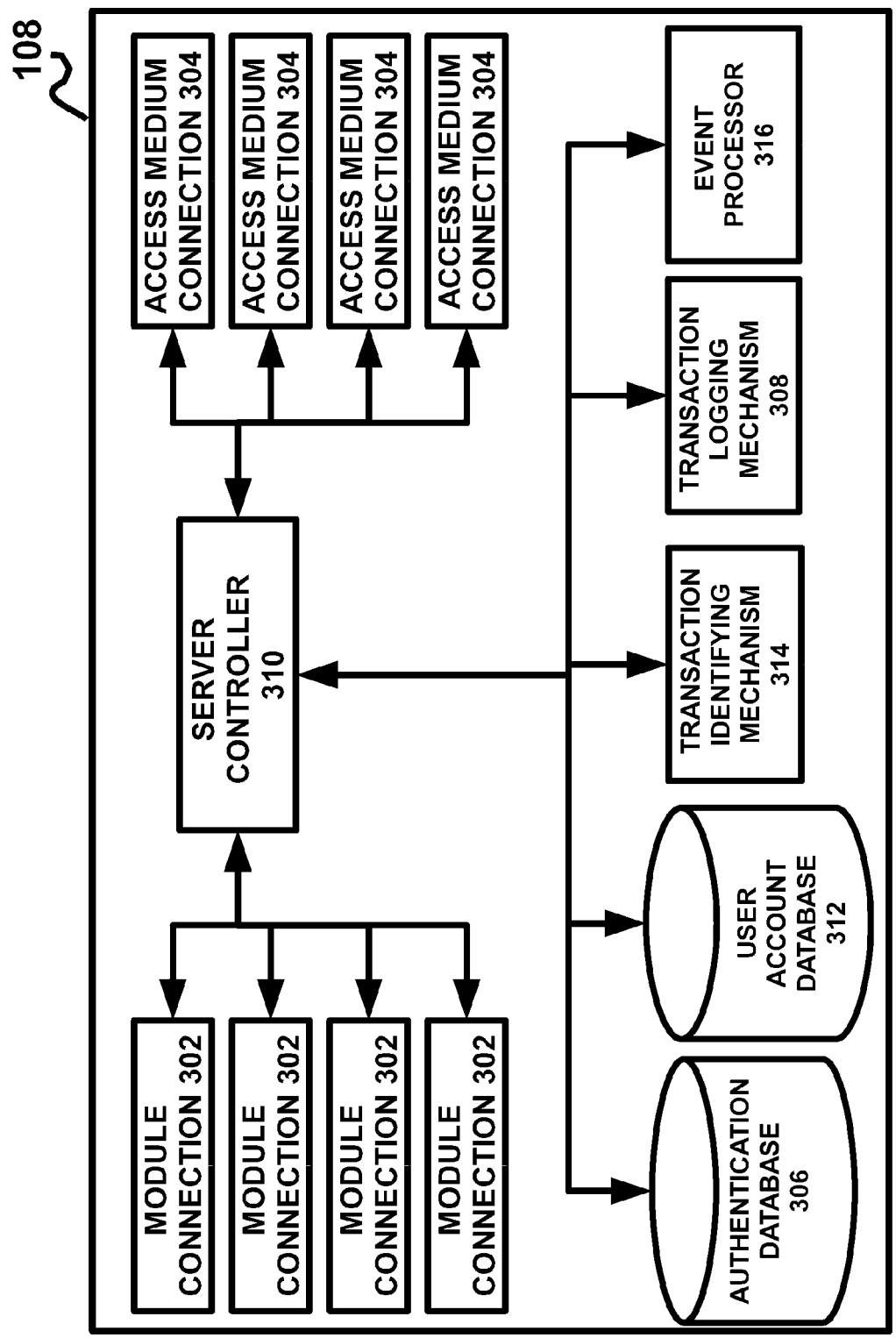
FIG. 3 illustrates an example of an embodiment of a module server enabled to interact with the hardware module of the present invention.
Figure 4:
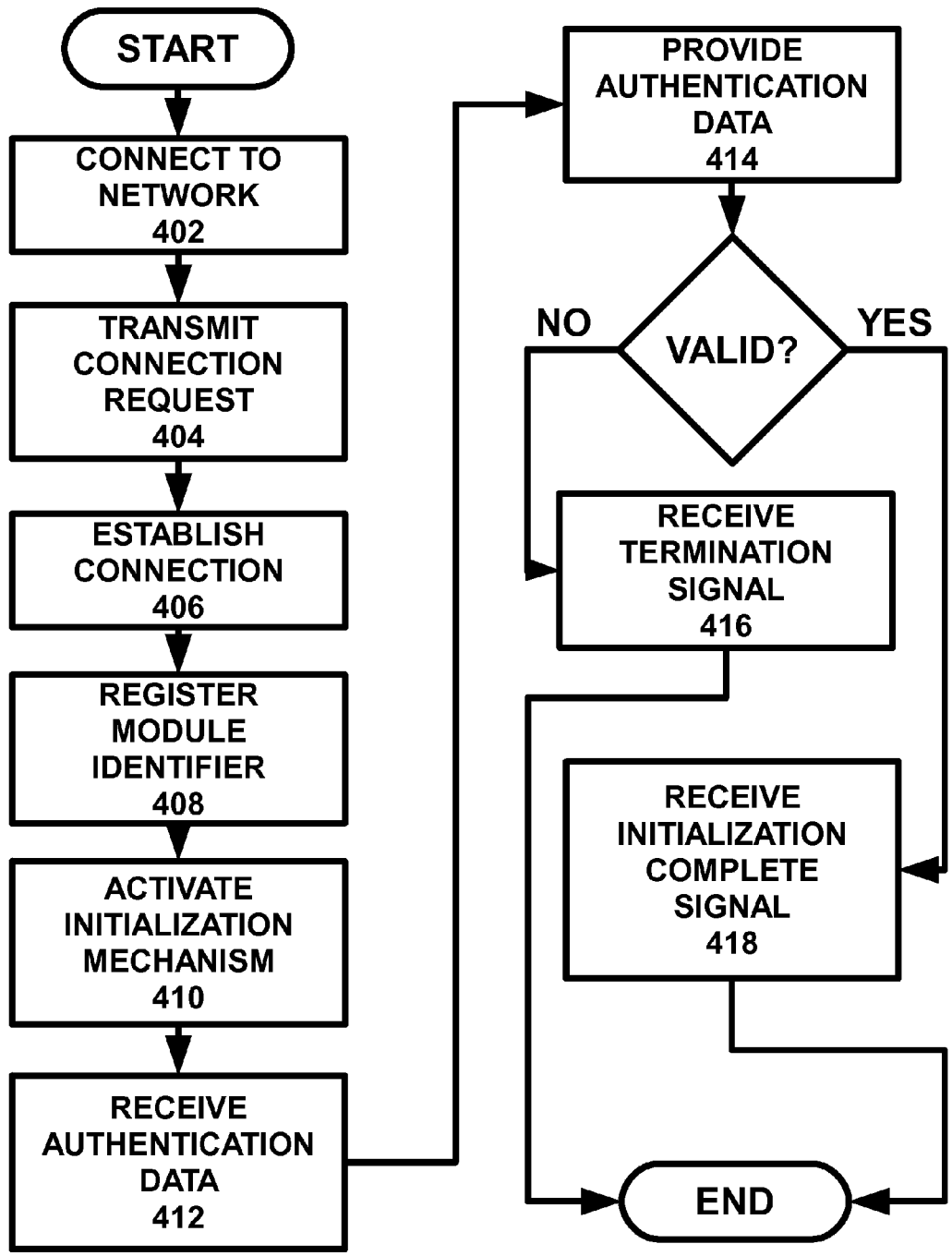
FIG. 4 illustrates a flowchart process of an embodiment of initializing the hardware module of the present invention.

As illustrated by FIG. 2, in one embodiment, the hardware module [102] can include a network connection mechanism [202], a controller mechanism [204], a memory mechanism [206], a power mechanism [208], an initialization mechanism [210], an initialization status display [212], a connectivity status display [214], an I/O channel port [216], and an event processor [218].

The hardware module [102] can be located at a location convenient to the entity employing it. For example, an individual may employ a hardware module [102] at his residence or a small business owner may employ a hardware module [102] at his work location. The hardware module [102] can be located anywhere, so long as the device [106] to be controlled or monitored can connect with the network connection mechanism [202].

The controller mechanism [204] can communicate with the components of the hardware module [102] to direct the flow of data, monitor and/or direct the activity of components, and the like. For example, the controller mechanism [204] can communicate with the network connection mechanism [202] to enable the communication of data to and from the hardware module [102]. In one embodiment, the controller mechanism [204] is a microcontroller. In addition to enabling the transmission of messages from an interfaced device [106] to the module server [108], the controller mechanism [204] can relay messages from a device [106] interfaced with one I/O channel port [216] (e.g., I/O channel port [216A]) to another device [106] interfaced with a different I/O channel port [216] (e.g., I/O channel port [216B]).

The network connection mechanism [202] can enable the hardware module [102] to connect to the network [104], and thereby transmit and receive data from the module server [108]. In one embodiment, the network connection mechanism [202] can connect with the network [104] via a local network [112]. For example, the hardware module [102] may function on any 10/100/1000 Base-T auto-negotiated network. In one embodiment, the network connection mechanism [202] can enable a wired connection. For example, the network connection mechanism [202] may be an Ethernet controller. Alternatively, the network connection mechanism [202] can enable a wireless connection. The hardware module [102] can function via a Dynamic Host Configuration Protocol (DHCP) or static addressing. If the local network [112] is configured for MAC filtering, the MAC address of the hardware module [102] can be added to the local network router's list of allowable addresses. Alternatively, the hardware module [102] can be connected to a non-MAC filtered network first and management tools can be used to change the MAC address of the hardware module [102]. Alternatively, the hardware module [102] can connect to the network [104] directly.

When the hardware module [102] connects to the network [104], it can establish a communication link with the module server [108]. The communication link may be established through any known protocol, such as via Transmission Control Protocol/Internet Protocol (TCP/IP). The hardware module [102] can accept communications from and transmit messages to the module server [108].

The hardware module [102] can include a memory mechanism [206] to store settings. For example, the memory mechanism [206] may be non-volatile random access memory (RAM).

The power mechanism [208] can enable the distribution of power to the hardware module [102]. For example, the power mechanism [208] may enable and monitor the receipt of electricity to power the hardware module [102] from an electrical cord or battery.

The initialization mechanism [201] can be used to establish a connective link between the hardware module [102] and a user account at the module server [108]. Additionally, the initialization mechanism [210] can enable a user to reset the hardware module [102] to a previous condition, such as its factory condition. The initialization mechanism [210] can be a manual implement. For example, the initialization mechanism [210] may be a button that the user pushes or holds down. Alternatively, the initialization mechanism [210] can be accessible electronically. For example, the user may operate the initialization mechanism [210] via his computer, such as via an access medium [110].

The hardware module [102] can include one or more display mechanisms, such as an initialization status display [212]. The initialization status display [212] can relate information associated with the hardware module's [102] connection to the module server [108]. For example, the initialization status display [212] may indicate one or more of the following:

the hardware module [102] has booted successfully and is attempting to connect to the local network [112];
the hardware module [102] has established a connection with the local network [112];
the hardware module [102] has successful accomplished a DHCP transaction and now has an IP address;
the hardware module [102] is attempting to resolve remote server's hostname to an IP address;
the hardware module [102] successful DNS hostname resolution;
the hardware module [102] is looking for the Internet gateway MAC address;
the hardware module [102] has found the Internet gateway and is searching for a free a local TCP socket;
the hardware module [102] has located a free local TCP socket and is attempting to connect to the module server [108];
the hardware module [102] has established a successful connection to the module server [108] and authentication has commenced; or
the hardware module [102] has successfully undergone authentication and normal operation has commenced.

In one embodiment, the initialization status display [212] is a seven segment LED numeric display.

The hardware module [102] can also include a connectivity status display [214]. The connectivity status display [214] can indicate the state of connectivity between the hardware module [102] and the module server [108]. For example, the connectivity status display [214] may indicate one or more of the following:

the hardware module [102] is not connected to the module server [108];
the hardware module [102] is connected to the module server [108];
the hardware module [102] is powering up; or
the hardware module [102] has disconnected from the module server [108] and is resetting.

The hardware module [102] can also include one or more I/O channel ports [216] that can interface with a device [106]. Although four I/O channel ports [216] have been depicted in FIG. 2 (i.e., 216A, 216B, 216C, 216D), this is not to be construed as limiting and amount can vary depending upon implementation. The device [106] can be any appropriate apparatus, such as a conventional device [106A] or a smart device [106B] (described in detail below). The hardware module [102] can interface with a device [106] via a wired or wireless connection. For example, an I/O channel port [216] can include an outlet to receive a wired plug. Alternatively, an I/O channel port [216] can be configured to receive a wireless signal. In one embodiment, the user can employ a medium adapter to interface a device [106] with the hardware module [102] wirelessly. The medium adapter can enable various wireless communication methods and can enable the conversion of various communication methods. For example, the medium adapter may enable the conversion of an electronic signal to a fiber optic or radio frequency signal.

The hardware module [102] can discover an interfaced device [106] manually or automatically. To manually discover a device [106], the user can access his user account and indicate the type of device [106] he had interfaced. For example, a user may access a MBDIS Web site, log into his user account and indicate the type of device [106], such as via a dropdown menu or from a checkbox list. Alternatively, the controller mechanism [204] can include a discovery protocol which can enable plug and play functionality. For example, the discovery protocol may interrogate the controller mechanism [204] to determine whether an interfaced device [106] is a conventional device [106A] or a smart device [106B].

In one embodiment, each I/O channel port [216] has a separate digital input, analog input, and digital output. Each I/O channel port [216] can be configured to employ digital input/output, analog input/output, serial data input/output, pulse and frequency counting/generation, audio input/output, video input/output, or the like. The hardware module [102] can be configured to set the state (i.e., the digital voltage level) of output on a particular I/O channel port [216] and can also read a voltage input level. As described below in regard to smart mode, an I/O channel port [216] can serve as a data channel for communication with interfaced smart devices [106B].

The I/O channel ports [216] can be independent from one another and may be the input and output means for the MBDIS [100]. Communication from the module server [108] to the hardware module [102] can instruct the hardware module [102] to change output lines on the I/O channel ports [216] while communication from the hardware module [102] to the module server [•] can relay information about device [106] values and other inputs.

An I/O channel port [216] can include multiple lines, or "pins." The functionality of each pin may vary dependent upon the operating mode of the particular I/O channel port [216]. An I/O channel port [216] can be capable of operating in one of two modes: normal mode and smart mode.

Normal Mode

When an I/O channel port [216] is set to normal mode, the hardware module [102] can use digital I/O and analog input capabilities native to the controller mechanism [204] to interact with an interfaced device [106]. For example, an I/O channel port [216] set to normal mode may be enabled for discreet digital input and/or output, pulse counting, frequency counting, serial input and/or output, and analog input and/or output, or the like. In normal mode, the hardware module [102] can interface with conventional devices, such as analog sensors, switches, lights, liquid crystal displays (LCDs), microcontroller units (MCUs), relays, or the like. A device [106] connected to an I/O channel port [216] set to normal mode can be considered a conventional device [106A].

Smart Mode

When an I/O channel port [216] is set to smart mode, the hardware module [102] can interface with more sophisticated devices [106]. Smart mode can convert the I/O channel port [216] into a digital communication port allowing other equipment to interface with the hardware module [102] and an I/O channel port [216] set for this mode may be capable of serial communication via standard and proprietary protocols. For example, smart mode may be employed if a particular function is beyond the scope of a simple analog sensor or digital I/O device. A device [106] interfaced to a smart mode-enabled I/O port channel [216] can be considered a smart device [106B]. A smart device [106B] can include its own controller mechanism, such as a microcontroller, to manage communication via its particular I/O port channel [216]. For example, smart devices [106B] may be serial or servo controllers, Infrared receivers and transmitters, video devices, audio devices, USB hardware, wireless transceiver, medium adapters, other peripheral hardware, or the like. Smart devices [106B] provide data to the hardware module [102], which can relay it to the module server [108], which can in turn transmit it to an access medium or another hardware module [102]. For example, the data can be sent to a networked database for logging. Likewise, messages intended for a smart device [106B] can be received by the module server [108], relayed to the hardware module [102] and then transmitted to the smart device [106B]. The hardware module [102] need not directly manage a smart device [106B]. In one embodiment, the hardware module [102] merely registers the existence of the smart device [106B] on startup and directs messages to and from it.

The hardware module [102] can act as a client while the interfaced smart device [106B] may function as a server. Despite these roles, this configuration allows for the smart device [106B] to generate and transmit a message unsolicited to the hardware module [102] and, in turn, the module server [108].

The hardware module [102] can also include an event processor [218]. The event processor [218] can monitor behavior of an interfaced device [106] and, when, a particular event occurs, the event processor [218] can push a message to another device [106] interfaced with the hardware module [102] or to the module server [108] and, in turn, an access medium [110] or one or more additional hardware modules [102]. For example, if the device [106] interfaced with the hardware module [102] is a thermometer, the event processor [218] can send a message to a second interfaced device [106] or to the module server [108] when a particular temperature is reached. As another example, the event processor [216] may receive video or audio data and, in turn, initiate a message transmission. In addition to, or instead of, initiating the pushing of data based upon a particular device event, the event processor [218] can push messages via an established schedule. For example, the interfaced device [106] may be a lamp and a user may configure the hardware module to turn on the lamp at a certain time on a certain day. Furthermore, the event processor [218] can communicate data when requested by an access medium [110]. For instance, continuing with the thermometer example, the user can employ an access medium [110] to request the thermometer's current temperature reading.

As is detailed below, the module server [108] can also include an event processor [316]. The event processor [316] located at the module server [108] can be functionally equivalent to the event processor [218] of the hardware module [102]. In one embodiment, the hardware module event processor [218] can be synchronized with the configuration maintained by the module server event processor [316]. Once configured, the hardware module event processor [218] can enable the hardware module [102] to function autonomously, regardless of whether it has an active connection to the module server [108].

Either, or both, the hardware module event processor [218] and the module server event processor [316] can cause the transmission of a message based on an event associated with one device [106] to a second device [106]. In one embodiment, both the first and second devices [106] can be interfaced with the same hardware module [102], either via separate I/O channel ports [216] or the same I/O channel port [216]. As such, the event processor [218/316] can cause the relaying of data between two or more devices [106] interfaced with the same hardware module [102].

Module Server

The module server [108] can relay data and instructions between a hardware module [102] and an access medium [110] or a second hardware module [102]. The module server [108] can be located remotely from the hardware module [102], but need not be. The module server [108] can include a server controller [310], one or more module connections [302], one or more access medium connections [304], an authentication database [306], a user account database [312], a transaction identifying mechanism [314], a transaction logging mechanism [308], and an event processor [316].

The server controller [310] can enable the flow of data amongst the various components of the module server [108].

A module connection [302] can be a socket waiting and listening for incoming communication from a hardware module [102]. A module connection [302] can enable the pulling and pushing of data between the module server [108] and a hardware module [102] (and, in turn, a device [106]). An access medium connection [304] is a socket used by the module server [108] to communicate with an access medium [110]. An access medium connection [304] can wait and listen for incoming communication from an access medium [110] and can receive conventional requests from Web services, such as Hypertext Transfer Protocol (HTTP) requests. For example, an access medium connection [302] can receive communication originating from a web browser or an automated Common Gateway Interface (CGI) script, desktop application, Web service API, or mobile application. In one embodiment, the module connections [302] and the access medium connections [304] wait and listen on different ports to ensure proper communication.

The authentication database [306] can maintain information pertinent to module identifiers (e.g., serial numbers). The authentication database [306] can maintain a record of all module identifiers for all hardware modules [102] distributed by the MBDIS service provider. The authentication database [306] can also maintain data pertaining to encryption. For example, when a hardware module [102] initiates a connection with the module server [108], the server controller [310] may access the authentication database [306] to locate a module identifier and its corresponding encryption key to authenticate the connection. If the module identifier is located and the encryption is successful, the hardware module [102] can interface with the module server [108] and, in turn, an access medium [110]. Alternatively, if a corresponding module identifier is not found or encryption fails, the server controller [310] can close the connection.

The module server [108] can include a transaction logging mechanism [308] to record transactions with one or more hardware modules [102]. The transaction logging mechanism [308] can be configured to record all transactions that are handled by the module server [108] and/or those indicated by the configurations established via the module server event processor [316] or the hardware module event processor [218]. The recorded data can be employed to analyze system data, such as to create charts, plots, or calculate values for record-keeping or event triggering.

The module server [108] can also include a transaction identifying mechanism [314]. As described in detail below, the transaction identifying mechanism [314] can associate a transaction identifier with each transmission sent to the hardware module [102] to ensure successful interaction between the module server [108] and the hardware module [102].

A user account database [312] can maintain user accounts for individuals who have registered their hardware modules [102] with the MBDIS [100]. A user account can include various information associated with the user, such as contact information (name, mailing address, email address, phone numbers, latitude/longitude, etc.), information particular to the user's hardware module(s) [102] (model data, make data, a module identifier, etc.), authentication information (e.g., username and password), financial account information (e.g., credit card numbers, etc.), or the like. An individual can create a user account prior to initializing his hardware module [102]. To create a user account, the user can provide the MBDIS service provider with the necessary information via a Web site, email, mail, verbally (e.g., via a customer service representative), fax, or the like.

As aforementioned, the module server [108] can include an event processor [316]. The event processor [316] can push a message to an access medium [110] or second hardware module [102] per an event that has occurred at a device [106] that is interfaced with a first hardware module [102]. This configuration can enable a user to monitor the performance of a device [106] in real time. In one scenario, the access medium [110] may be an email service, a text messaging service (e.g., Short Message Service (SMS), etc.), a social network service, or the like. For example, if the device [106] is a thermometer, the event processor [316] can push a message to a social networking service, such as Facebook, when the thermometer reaches a certain temperature, and the temperature data can be displayed as a status update. As another example, the temperature data can be sent to an email service and the user can receive the data in an email message. As with the hardware module event processor [218], the module server event processor [316] can also transmit messages on a scheduled, periodic basis. In addition to pushing messages, the event processor [316] can provide such data when requested by an access medium [110] or another hardware module [102].

A user can access his user account via, for example, the MBDIS Web site and configure one or more triggers and corresponding action for his registered hardware module(s) [102]. As mentioned above, the user can also initiate a synchronization process whereby the module server event processor [316] settings are synchronized with those of a hardware module event processor [218].

Regarding communication between a first hardware module [102] and a second hardware module [102], the event processor [316] can provide instructions to the second hardware module [χ] based on an event that occurred at the first hardware module [102]. For example, the event processor [316] may receive temperature data from a thermometer device [106] interfaced with the first hardware module [102] and, if the temperature data indicates a temperature higher than a certain threshold, the event processor [316] may send a message to the second hardware module [χ] instructing it to activate an interfaced cooling device [106]. The event processor [316] can act in a similar fashion to relay messages between two or more devices [106] interfaced with the same hardware module [102]. For instance, the event processor [316] may receive temperature data from a thermometer device [106] interfaced with one I/O channel port [216] and send a message to a cooling device [106] interfaced with a second I/O channel port [216] on the same hardware module [102]. In another example, the device [106] interfaced with the hardware module [102] may be a data storage medium and the user can employ the data storage medium to record data regarding a second device [106] interfaced with a different I/O channel port [216] or another hardware module [102].

In addition, or instead of, sending a message to an access medium [110] or a hardware module [102], the event processor [316] can send data to the transaction logging mechanism [308]. The user can employ this configuration when he wishes to, for example, record data from a device [106], but does not desire real-time monitoring. Additionally, the transaction logging mechanism [308] can enable various visualization processes so that data recorded via the event processor [316] can be analyzed. For example, data recorded by the transaction logging mechanism [308] can be accessible via an access medium [110], such as a Web widget that can display the recorded data as a chart or graph.

The event processor [316] can also be enabled to transmit data to an external database for recordation, analysis, or the like.

Access Medium

The access medium [110] can be a mechanism by which a user can interact, via the module server [108], with a device [106] interfaced with a hardware module [102]. For example, an access medium [110] may be an API, a Web service, a Web interface, or the like. As aforementioned, via an access medium [110], a user can control or monitor a device [106]. For example, an access medium [110] can request data from a device [106], translate data generated by a device [106] into a useful syntax and display it, push a command to a device [106], or the like. The access medium [110] can be provided by portable, client-side scripting that allows for embedding control and monitoring resources into Web sites, mobile device applications and widgets, Web service feeds, social networks, Web service APIs, or the like. The access medium [110] interpret data received from a device [106] and present the data to users and Web services in current and appropriate scales, formats, and syntaxes. For example, an access medium [110] can receive data from a thermometer device [106] and present that data in degrees Fahrenheit or Centigrade. The access medium [110] can receive data based upon push data transmission initiated by an event processor [218/316], can request data itself, or it can access data recorded in the transaction logging mechanism [308] (e.g., to display such logged data a chart, graph, or the like).

Additionally, an access medium [110] can also allow a user to configure the hardware module [102] and/or its interfaced devices [106] via the module server [108]. For example, the user may set an I/O channel port [216] to normal mode or smart mode.

An access medium [110] can be accessible via Web-enabled devices, such as personal computers and mobile devices (e.g., mobile phones, smart phones, personal digital assistant, etc.).

To enhance user convenience, the MBDIS service provider can offer one or more access mediums [110] to users. For example, a user may visit an MBDIS Web site and access ready-made Web widget coding that can be input into the coding of a Web page in order to control or monitor a device [106] from the Web page. The MBDIS service provider can provide access mediums [110] for common functionalities, such as light levels, temperature display, weather information, and the like. The MBDIS sever provider can also provide a convenient interface by which a user can create a customized access medium [110]. For example, an MBDIS Web site may include a point and click interface, a wizard interface, or another form of customized programming interface by which a user may generate a customized access medium [110] suitable to the user's needs and/or the particular functionality of a device [106].

Hardware Module Initialization

In order for a user to employ to a hardware module [102], he may be required to authenticate it with the module server [108], thereby linking his hardware module [102] to his user account. The MBDIS service provider can employ an authentication process in order to confirm that an actual individual wishing to employ a particular hardware module [102] is initializing the hardware module [102], rather than an automated process. This can ensure the hardware module [102] is being employed with the user's permission.

To begin initialization, the user can connect his hardware module [102] to the network [ψ] [step 402]. As aforementioned, the user may connect his hardware module [102] to the network [104] via a local network [112]. The hardware module [102] can then transmit a connection request to the module server [108] [step 404]. The module server [108] can be configured to listen to the network [104] and enabled to await such requests. Once a connection has been established between the module server [108] and the hardware module [102] [step 406], the connectivity status display [214] can indicate this (e.g., by displaying a green light).

The user can then register a module identifier associated with the hardware module [102] with the module server [108] [step 408]. In one embodiment, the user can register a module identifier by associating it with a user account maintained by the module server [108]. The module identifier can be, for example, a serial number included on the hardware module [102] and/or documentation provided to the user when the hardware module [102] was acquired. The module identifier can also be included in firmware maintained by the hardware module [102]. In addition to registering the module identifier, the user can register contact information, authentication information (e.g., username and password), financial account information, or the like.

The registration process can involve the user establishing a user account with the MBDIS service provider. The user can establish the user account prior to the initialization. Additionally, the user can be allowed to register multiple hardware modules [102] with the same user account and, therefore, can employ the initialization process to add an additional hardware module [102] to an existing user account. In one embodiment, the user can establish a user account by employing a computing device (e.g., personal computer, mobile device, etc.) to access a Web site linked to the module server [108]. Once at the Web site, the user can register the module identifier and other information. In alternate embodiments, the user can establish and/or augment a user account via other methods. For example, a user may verbally establish an account by calling the MBDIS service provider and providing the necessary information to a customer service representative. As another example, a user may complete a registration form and mail, email, or email it to the MBDIS service provider.

Once the user has registered the module identifier with his user account, he can activate the initialization mechanism [210] [step 410]. For example, if the initialization mechanism [210] is an external button, the user may hold the button for particular amount of time (e.g., five seconds). The initialization status display [212] can indicate to the user that initialization has commenced.

The hardware module [102] can receive authentication data transmitted from the module server [108] [step 412]. The hardware module [108] can display this authentication data to the user via the initialization status display mechanism [212]. For example, the module server [108] may transmit a series of digits to the hardware module [108] and the initialization status display mechanism [212] may display the digits to the user.

The user can provide the transmitted authentication data to the MBDIS service provider [step 414]. In one embodiment, the user can enter the displayed authentication data at a Web site linked to the module server [108]. The user may do so during the same session with which he registered the module identifier. In alternate embodiments, the user can provide the authentication data by verbally relating it to a customer service representative (e.g. via telephone), or by mailing, emailing, or faxing the authentication data to the MBDIS service provider.

The provided authentication data is relayed to the module server [108], which analyzes it to determine if it is valid. If the provided authentication data is incorrect, the user may be requested to provide it again. If the user cannot successfully do so, the hardware module [102] can receive a termination signal from the module server [108] [step 416] and the hardware module [102] may not be activated. If the authentication data is deemed valid, the hardware module [102] can receive a signal from the module server [108] indicating that the initialization is complete [step 418]. The hardware module [102] can now have an active connection with the module server [108] and the initialization display mechanism [212] can signal the end of initialization.

Communication Between the Hardware Module and the Module Server

As aforementioned, the configuration of the MBDIS [100] can enable the hardware module [102] to serve as a client rather than a server. The hardware module [102] can issue transmissions via the network [104] to the module server [108] without the module server [108] replying immediately. In one embodiment, Internet Protocol (IP), such as HTTP protocol, can be used for communication between the hardware module [102] and the module server [108]. The hardware module [102] can act as a client and issue requests to the module server [108]. The module server [108] need not reply immediately, thereby allowing the hardware module [102] to send another request to push data to the module server [108]. Although it may, the hardware module [102] need not request anything from the module server [108]. Once the hardware module [102] makes its initial connection, requests can be generated by the module server [108].

The hardware module [102] can push data to the module server [108] and can do so without being solicited. In one embodiment, the hardware module [102] can transmit HTTP POST requests, which are not cached by web proxy servers. Furthermore, the use of HTTP POST transmissions with no immediate reply from the module server [108] enables web proxy servers to manage the communication between the hardware module [102] and module server [108] as standard HTTP traffic, thereby alleviating unnecessary burden upon the MBDIS [100].

Figure 5:
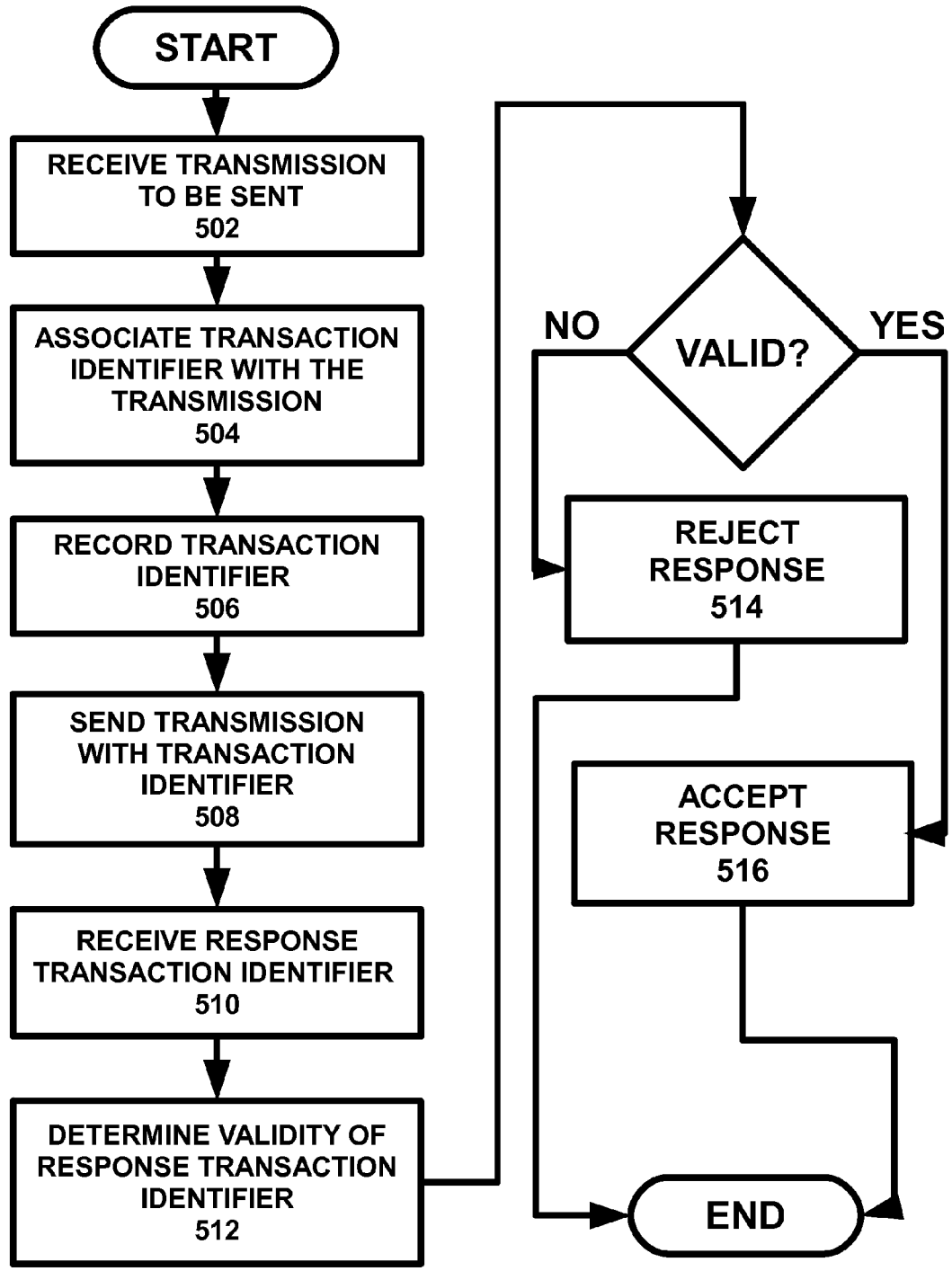
FIG. 5 illustrates a flowchart process of an embodiment of a module server communicating with the hardware module of the present invention.

The module server [108] can manage numerous connections simultaneously. Since the module server [108] can request data from the hardware module [102] in addition to the hardware module [102] being able to send data to the module server [108], there is the possibility that data messages may cross in transit. As illustrated by FIG. 5, the transaction identifying mechanism [314] can prevent any problem that may occur due to such a situation. The server controller [310] can receive a transmission to be sent to the hardware module [102] [step 502]. For example, a user may employ an access medium [110] to send control instructions to the hardware module [102] or the event processor [316] may wish to send data to a hardware module [102] per an event triggered by a device [106]. The transaction identifying mechanism [314] of the module server [108] can associate a transaction identifier with each transmission to be sent to the hardware module [102] [step 504]. The transaction identifying mechanism [314] can record this transaction identifier [step 506]. For example, the module server [108] may issue a unique, six digit transaction identification code with each request sent to the hardware module [102]. The module server [108] can send the transmission with its associated transaction identifier to the hardware module [102] [step 508]. The module server [108] can receive a response transmission from the hardware module [102] and the response can include a transaction identifier, such as in a Uniform Resource Identifier [step 510]. The transaction identifying mechanism [314] can compare the received transaction identifier with those it has recorded to determine if the response is a valid transmission [step 512]. If the received transaction identifier does not match one recorded, the response can be rejected [step 514]. If the received transaction identifier matches on record, the response is deemed a valid transmission and accepted [step 516]. As aforementioned, the hardware module [102] can transmit data unsolicited. For such transmissions, the controller mechanism [204] of the hardware module [102] can associate a particular transaction identifier with all unsolicited transmissions and the transaction identifying mechanism [314] can be configured to treat all such transmissions as valid. For example, the hardware module [102] may use the transaction identifier "000000" for all unsolicited transmissions.

For example, in one scenario, a message from the hardware module [102] may be formatted as follows:
POST/001234 HTTP/1.1
Host: www.hardwareserver.com
Content-Encoding: application/octet-stream
Cache-Control: no-transform, no-store, private
Content-Length: 15
Message: Hh8Slykd08Mp82g
In the example above, the transaction identifier is 001234.

As another example, a request from the module server [108] to the hardware module [χ] may be formatted as the following:

HTTP/1.1 200 OK
Date: Mon, 14 Jul. 2008 04:28:18 GMT
Cache-Control: no-transform, no-store, private
Content-Encoding: application/octet-stream
Content-Length: 23
Message: uN05aJdnaSneH96hu6ds11
In this example, the transaction identifier is included, and encrypted, in the message body (e.g., 059611).

Messages Pushed by the Hardware Module to the Module Server

As mentioned, the hardware module [102] can generate and transmit messages on its own volition. For example, rather than the module server [108] periodically polling the hardware module [102] for the status of a digital input, the event processor [218] of the hardware module [102] can push a message at the instant it receives an indication from an I/O channel port [216] that an event has occurred at an interfaced device [106]. The hardware module [102] can push data to the module server [108] or a device [106] on a separate I/O channel port [216] via auto-messaging, triggered messaging, or a smart device push. Auto-messaging and triggered messaging can be accomplished via an I/O channel port [216] set to normal mode, while a smart device push can be handled via smart mode.

To push data via auto-messaging, the event processor [218] of the hardware module [102] can be configured to send the state of the I/O channel port [216] (and therefore the interfaced conventional device [106A]) automatically at a set schedule. For example, an analog input value can be sent every fifteen seconds. Each I/O channel port [216] can be set to send either its analog input or digital input at a user determined schedule. Each I/O channel port [216] auto-message interval can be set independently.

Data can be pushed via triggered messaging when the state of a digital or analog input from the interfaced conventional device [106A] changes. Each I/O channel port [216] can have a configurable trigger and reset value. The hardware module [102] can send a message when an input reaches a certain level.

If the I/O channel port [216] is set to smart mode, the hardware module [102] can transmit an unsolicited message from the smart device [106B]. The message can be sent on behalf of the configuration of the smart device [106B] itself. For example, particular events, activities, actions, or the like that occur via the smart device [106B] may initiate the transmission of data to the hardware module [102] and in turn the module server [108] or another device [106] interfaced with a separate I/O channel port [216].

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention. Therefore, the description should not be considered to be exclusive of these other embodiments. Also, it is to be understood that the phraseology and terminology employed herein are for the purposes of description and should not be regarded as limiting.

The invention claimed is:

1. A system for enabling interaction with devices via a network, the system comprising:
a first hardware module configured to:
be a first client with a server,
interface with a first device via the network, communicate first data regarding the first device from the
first device to the server over the network,
communicate the first data regarding the first device to a
second device interfaced with the first hardware module, and
communicate second data from the server to the first
device over the network; and
the server configured to:
receive the first data from the first hardware module,
communicate the first data to a second hardware module that is a second client with the server and to an
access medium that is configured to perform one or
more of the following: operate the first device or
monitor the first device, and
communicate, to the first hardware module, the second
data received from at least one of:
the second hardware module, or
the access medium.

2. The system of claim 1, wherein
an event processor, included in the first hardware module
or the server, is configured to initiate communication of
the first data or the second data between the first
hardware module and the server.

3. The system of claim 1, wherein the access medium is accessible via one or more of a personal computer and a mobile device.

4. The system of claim 1, wherein the first device includes a microcontroller.

5. The system of claim 1, wherein the server is configured to record particular data pertaining to the first data and the second data communicated via the server.

6. A server configured to interact with a first hardware module, the server comprising:
a hardware module connection configured to, via a network, communicate information to and from the first hardware module interfaced with a device, the first hardware module being a first client with the server and communicating first data from the device to the server and communicating second data from the server to the device;
an access medium connection configured to, via the network, communicate the second data to and from an access medium configured to perform one or more of the following: operate the device or monitor the device;
a controller mechanism configured to transmit the first data and the second data between the hardware module connection interfaced with the first hardware module and:
the access medium connection interfaced with the access medium, and an additional hardware module connection interfaced with an additional hardware module that is a second client with the server; and
an event processor configured to initiate communication of the first data to the access medium or the additional hardware module based upon at least one of a triggered event or a scheduled event.

7. The server of claim 6, further comprising an authentication database configured to store identification data identifying the first hardware module.

8. The server of claim 6, further comprising a transaction logging mechanism configured to record information associated with the first data and the second data.

9. The server of claim 6, further comprising a transaction identifying mechanism configured to associate a transaction identifier with the first data and the second data.

10. The server of claim 6, further comprising a user account database configured to store user data associated with a user of the first hardware module.

11. A first hardware module comprising:
a network connection mechanism configured to enable the first hardware module to interact via a network as a first client with a server, wherein the first hardware module communicates first data from a device interfaced with the first hardware module to the server and communicates second data from the server to the device, and the server communicates the first data and the second data between the first hardware module and an access medium configured to control or monitor the device and an additional hardware module that interacts via the network as a second client with the server;
a connection configured to interface the first hardware module with the device;
a controller mechanism configured to transmit the first data and the second data between the network connection mechanism and the connection; and
an event processor configured to initiate communication of the first data or the second data based upon at least one of a triggered event or a scheduled event.

12. The first hardware module of claim 11, further comprising a memory mechanism configured to store the first data and the second data.

13. The first hardware module of claim 11, wherein the event processor is configured to initiate communication of the first data through the connection.

14. The first hardware module of claim 11, wherein the event processor is configured to initiate communication of the first data between the device interfaced with the connection to a different device interfaced with a different connection of the first hardware module.

15. The first hardware module of claim 11, wherein the event processor is configured to initiate communication of the first data and the second data to the server.

16. The first hardware module of claim 15, wherein the event processor is configured to initiate communication of the first data to the server to transmit the first data to the access medium or the additional hardware module.

17. A method for a hardware module-based system, the method comprising:
interfacing a server, configured to communicate via a network, with a first hardware module that acts as a first client with the server, an access medium, and a second hardware module that acts as a second client with the server;
interfacing the first hardware module with a first device, wherein the first hardware module communicates first data from the first device to the server over the network and communicates second data from the server to the first device over the network, wherein the server communicates the first data to the access medium and the second hardware module, wherein the server communicates the second data from the access medium or the second hardware module to the first hardware module, wherein the first data instructs the second hardware module to activate an additional device, and wherein the first data is utilized by the access medium to monitor or control the first device;
associating a transaction identifier with the first data;
recording the transaction identifier associated with the first data;
communicating, from the server to the second hardware module, the first data and the recorded transaction identifier;

receiving a response from the second hardware module, wherein the response includes a response transaction identifier;

determining whether the response transaction identifier matches the recorded transaction identifier;

accepting the response if the response transaction identifier matches the recorded transaction identifier; and denying the response if the response transaction identifier does not match the recorded transaction identifier.

18. The method of claim 17, further comprising recording an unsolicited transmission identifier.

19. The first hardware module of claim 11, wherein the connection is configured to operate in a normal mode in which digital input/output capabilities and analog capabilities native to a controller of the first hardware module are utilized to interact with the device, and wherein the connection is configured to operate in a smart mode in which the connection is converted to a digital communication port and configured to utilize serial communication to interact with the device.

20. A method comprising:

establishing a first client-server connection between a first hardware module and a server, the first client-server connection established through a network;

receiving, at the first hardware module, first data from a first device coupled to the first hardware module;

sending, by the first hardware module, the first data to the server over the network;

receiving, at the server, second data from an access medium or a second hardware module;

sending, by the server, the second data to the first hardware module over the network;

sending, by the server, the first data to the access medium or the second hardware module; and using the first data by the access medium to control or monitor the first device or using the first data by the second hardware module to activate an additional device coupled to the second hardware module.

21. The method of claim 20, further comprising initiating, by an event processor in the first hardware module or the server, communication of the first data between the first hardware module and the server.

22. The method of claim 20, wherein the access medium is accessible via one or more of a personal computer and a mobile device.

23. The method of claim 20, wherein the first device includes a microcontroller.

24. The method of claim 20, further comprising storing, at an authentication database, identification data identifying the first hardware module.

25. The method of claim 20, further comprising recording, at a transaction logging mechanism, information associated with the first data and the second data.

26. The method of claim 20, further comprising associating a transaction identifier with the first data and the second data.

* * * * *